(12) United States Patent
Kohl et al.

(10) Patent No.: US 6,339,738 B1
(45) Date of Patent: Jan. 15, 2002

(54) METHOD FOR THE CONTROL OF A HYDRAULIC PUMP IN A REGULATED BRAKING SYSTEM

(75) Inventors: Andreas Kohl, Mainz; Robert Schmidt, Rennerod; Dieter Burkhard, Waldfischbach-Burgalben; Jürgen Woywod, Mörfelden, all of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/242,312

(22) PCT Filed: Aug. 4, 1997

(86) PCT No.: PCT/EP97/04232

§ 371 Date: Dec. 9, 1999

§ 102(e) Date: Dec. 9, 1999

(87) PCT Pub. No.: WO98/06611

PCT Pub. Date: Feb. 19, 1998

(30) Foreign Application Priority Data

Aug. 12, 1996 (DE) .......................................... 196 32 311

(51) Int. Cl.$^7$ .............................. G06F 7/70; G06G 7/76
(52) U.S. Cl. ............................ 701/70; 701/78; 701/83; 303/115.4; 303/115.5; 188/151 R; 188/152
(58) Field of Search .............................. 701/70, 71, 76, 701/78, 83, 92; 303/114.1, 113.4, 113.5, 115.1, 166, 115.4, 116.1, 139, 158, 10, 11, 186, 146, 148, 149, 122.05, 122.12, 116.2; 188/181 A, 181 C, 356, 358, 151 R, 152, 72.4

(56) References Cited

U.S. PATENT DOCUMENTS

| | | | | |
|---|---|---|---|---|
| 4,771,387 A | * | 9/1988 | Hexel et al. ................... 701/76 |
| 4,975,852 A | * | 12/1990 | Fennel et al. ................... 701/78 |
| 5,265,947 A | * | 11/1993 | Wupper et al. ............. 303/156 |
| 5,496,099 A | * | 3/1996 | Resch ...................... 303/114.1 |
| 5,567,022 A | * | 10/1996 | Linkner, Jr. ................... 303/87 |
| 5,788,337 A | * | 8/1998 | Eckert ........................... 303/3 |

FOREIGN PATENT DOCUMENTS

| | | |
|---|---|---|
| DE | 37 31 408 | 4/1989 |
| DE | 38 18 260 | 12/1989 |
| DE | 40 15 866 | 11/1991 |
| DE | 40 20 449 | 1/1992 |
| DE | 41 12 134 | 12/1992 |
| DE | 42 32 614 | 3/1994 |

(List continued on next page.)

OTHER PUBLICATIONS

Search Report of the German Patent Office for German Appl. No. 196 32 311.8.

*Primary Examiner*—Jacques H. Louis-Jacques
(74) *Attorney, Agent, or Firm*—Rader, Fishman & Grauer PLLC

(57) ABSTRACT

In a method for the adaptive control of the hydraulic pump of a brake system containing low pressure accumulator (NDS1,2) which take up the pressure fluid discharged in the case of control from the wheel brakes and which are evacuated by the hydraulic pump (HP), first the brake pressure pattern ($p_R$) is determined for each individual wheel with the aid of a wheel pressure model. Then a volume model (VM1,2) is formed on the basis of the wheel pressure model for each individual brake circuit, which volume model indicates, by way of approximation, the filling level of the low pressure accumulators (NDS1,2). The maximum filling level (MaxV) and the control frequency or the time interval (T) between two successive brake pressure decreasing phases (Ph2) are determined. The delivery capacity of the hydraulic pump (HP) is so dimensioned that the time interval (T) between two successive brake pressure decreasing phases (Ph2) is just adequate for completely evacuating the low pressure accumulators (NDS1,2).

6 Claims, 4 Drawing Sheets

FOREIGN PATENT DOCUMENTS

| | | |
|---|---|---|
| DE | 44 07 923 | 11/1994 |
| DE | 44 12 822 | 10/1995 |
| DE | 44 40 517 | 5/1996 |
| EP | 0 313 292 | 4/1989 |
| EP | 05 77 609 | 1/1994 |
| WO | 96 15927 | 5/1996 |

* cited by examiner

METHOD FOR THE CONTROL OF A HYDRAULIC PUMP IN A REGULATED BRAKING SYSTEM

BACKGROUND OF THE INVENTION

The present invention is concerned with a method for the adaptive control of the hydraulic pump of a controlled brake system containing low-pressure accumulators which take up at least a part of the pressure fluid discharged, in case of control, from the wheel brakes and which are evacuated by the hydraulic pump. In this method, a volume model is formed by sensing and evaluating of parameters determining the pressure fluid flow, which volume model approximately indicates the discharge and supply of pressure fluid.

DE 38 18 260 A1 discloses a circuit configuration for controlling the auxiliary energy supply of a brake system provided with anti-locking control and/or traction slip control systems, wherein—by measuring and evaluating parameters determining the required auxiliary energy or the pressure fluid flow—a volume model is formed which approximately indicates the pressure fluid discharge from the master cylinder of the brake system and the pressure fluid requirement. The said volume model is used for controlling the auxiliary energy supply, namely for actuating and de-actuating a hydraulic pump, thereby insuring a low auxiliary energy consumption, relatively low pressure fluctuation amplitudes during a control process and an improved pedal comfort because the undesired set-back of the brake pedal during activation of the pump is reduced.

In another conventional brake system described in DE 42 32 614 A1 the filling level of the low pressure accumulator of a hydraulic brake system provided with an anti-locking control system is determined by measuring and evaluating the pressure at the inlet of the low pressure accumulator or with the aid of a way-sensor measuring the stroke of the piston in the low pressure accumulator, and evaluated for determining the required delivery capacity of the pump, and, finally, for controlling the hydraulic pump.

Moreover, D 44 40 517 A1 teaches a method for controlling the return pump of a brake system in which the pump is controlled in response to the value of a variable and/or a control deviation of a controller affecting the brake moment or the number of revolutions of the wheel.

Finally, EP 05 77 609 B1 teaches to reduce, in a brake system comprising an anti-locking control and a traction slip control system (ABS and ASR), the number of revolutions of the hydraulic pump in the ASR-mode by limiting the power input of the electric motor actuating the pump to reduce the development of noise. In safety-critical situations or in special cases of malfunction the input limitation becomes abandoned.

Now, it is the object of the invention to provide a method for determining the actually required delivery capacity and, hence, for determining, with relative accuracy, the number of revolution momentarily required. It is intended to determine the lowest possible yet in any case adequate number of revolutions which also in critical situations and in unfavorable circumstances is still sufficient.

For safety reasons, a speed and delivery capacity adequate in all eventualities has been mandatory. Conversely, a high value has been attached to a low number of revolutions of the pump to avoid the development of disturbing noises dependent on the number of revolutions, and to enhance the pedal comfort affected by undesired pedal movements.

SUMMARY OF THE INVENTION

It has been found that this problem, in the practice of the invention, can be solved by a method, the special features of which reside in that, in a first step, the course of the brake pressure at least approximately is determined for each individual wheel; that on the basis of the course of the brake pressure within the wheel brakes connected to a brake circuit, a volume model is formed for each brake circuit which approximately indicates the pressure fluid volume taken up by each low-pressure accumulator, and the filling level of the low-pressure accumulator, respectively; that the control frequency and the time interval between two successive brake pressure decreasing phases, respectively, are determined; and that the delivery capacity of the hydraulic pump is so dimensioned that the time interval between two successive phases will (just) be adequate for completely evacuating the low-pressure accumulator.

The method of the invention, hence, is based on a numerical evaluation of the data available. The provision of additional sensors is foregone. First, the wheel brake pressure is determined for each—individual—wheel, preferably by a so-called wheel pressure model; then the volume model indicating the filling level (or the available residual volume of the accumulator) from the actuating time of the outlet valve and the wheel pressure of the connected wheel brakes is determined for each—individual—brake circuit. According to a preferred form of embodiment, the maximum value of the filling level determined in the form of the volume model is selected and, based thereon and on the control frequency or on the time interval between two successive brake pressure decreasing phases, the number of revolutions of the pump is dimensioned.

The invention is based on the recognition that the number of revolutions of the pump adequate for immediately and completely evacuating the low-pressure accumulator and a—apart from a certain safety margin—by no means higher than absolutely required, can be determined in the afore-described way, thereby safeguarding the brake functions and at the same time minimizing the development of noise.

According to another preferred form of embodiment of the invention a wheel brake pressure model based on the momentary deceleration of the automotive vehicle which is a measure of the momentary blocking pressure level, is numerically formed on the basis of the valve actuating times and the pressure/volume characteristic of the system for determining the course of the brake pressure within the individual wheel brake for each individual wheel. Theoretically, it would also be possible to use for each wheel a pressure sensor, which, however, would involve substantially enhances costs.

The volume model indicating the filling level of the low pressure accumulator (or the available residual volume), in the practice of the invention, is based on the course of the brake pressure determined for each individual wheel, on the outlet valve actuating times and, of course, on the pressure-volume characteristic of the hydraulic system. It is also in this respect that the provision of sensors has been foregone.

Moreover, it has proved advantageous to fix in response to the volume model and to the maximum filling level in the low pressure accumulators evacuated by a common hydraulic pump, a minimum value or a pre-controlled value of the number of revolutions of the pump, which is then compared to the number of revolutions of the pump determined in response to the control frequency. This is a safety measure for insuring a minimum number of revolutions. The minimum value will take effect only if the number of revolutions responsive to the control frequency is lower.

The afore-mentioned minimum value or the pre-controlled value is dependent on the momentary filling level of the low pressure accumulator, namely on the maximum value. Moreover, it is possible to vary the minimum value in response to the speed of the automotive vehicle. At low speeds, a relatively low number of revolutions certainly will in any case be adequate.

Further features, advantages and fields of end-use application of the invention will become manifest from the following description of additional details of the invention with reference to the accompanying drawings.

DETAILED DESCRIPTION OF THE DRAWINGS

Figure 1:
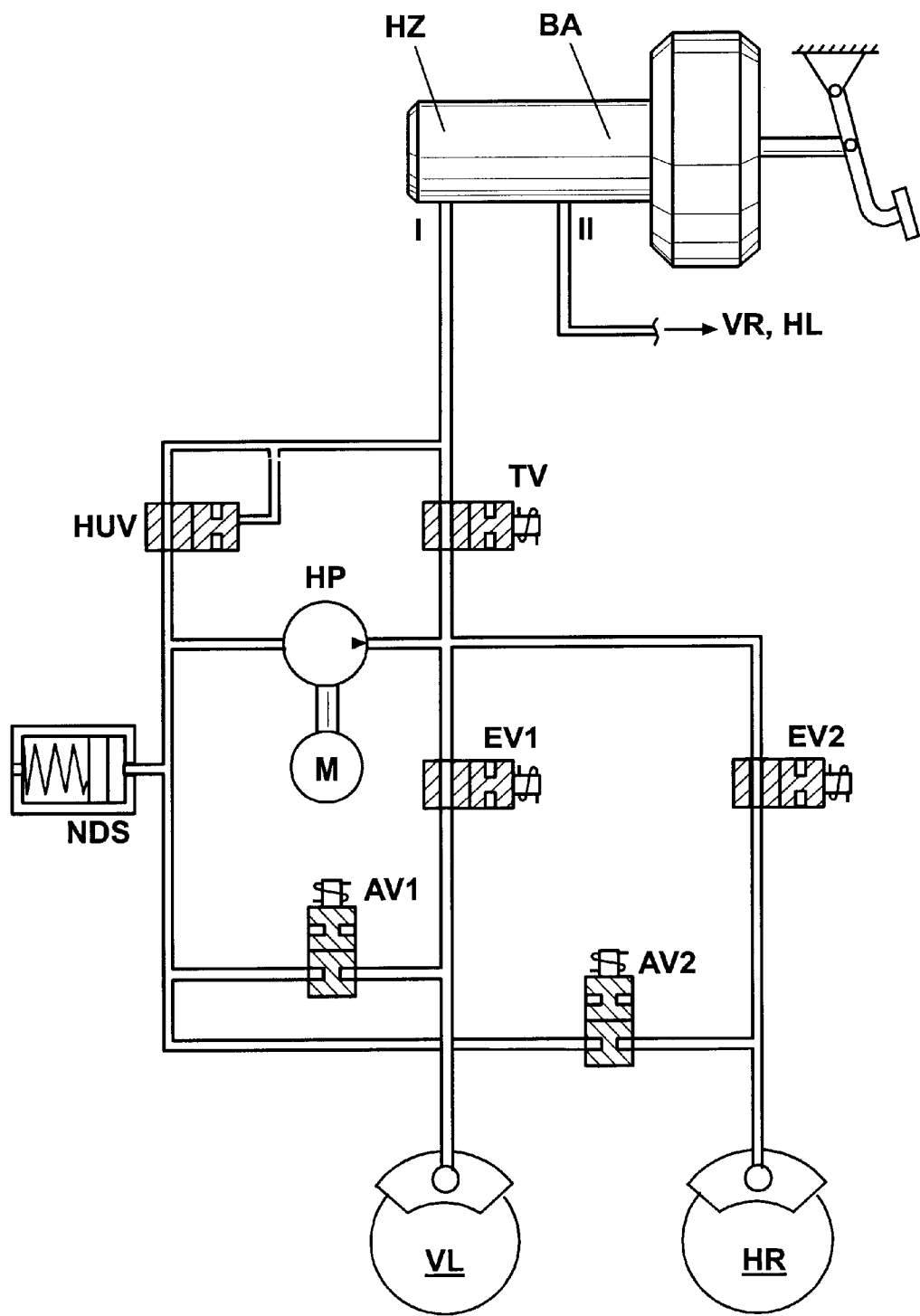
FIG. 1 schematically shows (restricted to one brake circuit) the major component parts of a hydraulic brake system comprising anti-locking control and traction slip control systems.

Now, referring to the drawings, FIG. 1 shows the basic structure of a hydraulic brake system of the afore-described type, which is a dual-circuit brake system BA connected to the master cylinder HZ of which are the two hydraulically separated brake circuits I, II. As the two brake circuits I, II are identically configured, only the component parts of brake circuit I have been described. In a brake system of a diagonal brake circuit division, the left-hand front wheel VL and the right-hand rear wheel HR are, as shown, connected to the brake circuit I while the two other wheels VR, HL are identically connected to brake circuit II.

In hydraulic brake systems of the afore-described type, each wheel is provided with an inlet valve EV1 or EV2 and with an outlet valve AV1, AV2. In its initial or resting position, the inlet valves EV1, EV2 are switched to passage while the outlet valves AV1, AV2 are blocked.

The form of embodiment as shown is a so-called closed hydraulic system so that the pressure fluid discharged in the brake pressure decreasing phase via an outlet valve AV1, AV2 from the wheel brake is returned with the aid of a hydraulic pump HP. For achieving a faster pressure decrease, a low pressure accumulator NDS is provided for each brake circuit which first takes up the discharged pressure fluid and which is then evacuated via the hydraulic pump HP.

The brake system as shown is also suitable for the traction slip control. To that effect, a separating valve TV open in the resting position and blocked in the ASR mode is provided. In the ASR mode, a hydraulic path is provided between the intake side of the hydraulic pump PH and the master cylinder HZ through a hydraulic switch-over valve HUV which, in the resting position and with a non-pressurized master cylinder HZ, respectively, is switched to passage. In the ABS-mode, the valve HUV is blocked.

All inlet, outlet and separating valves can be electromagnetically actuated. The hydraulic pump HP is actuated by an electric motor M to which is also connected a corresponding pump or a pump circuit arranged in brake circuit II (not shown).

Figure 2:
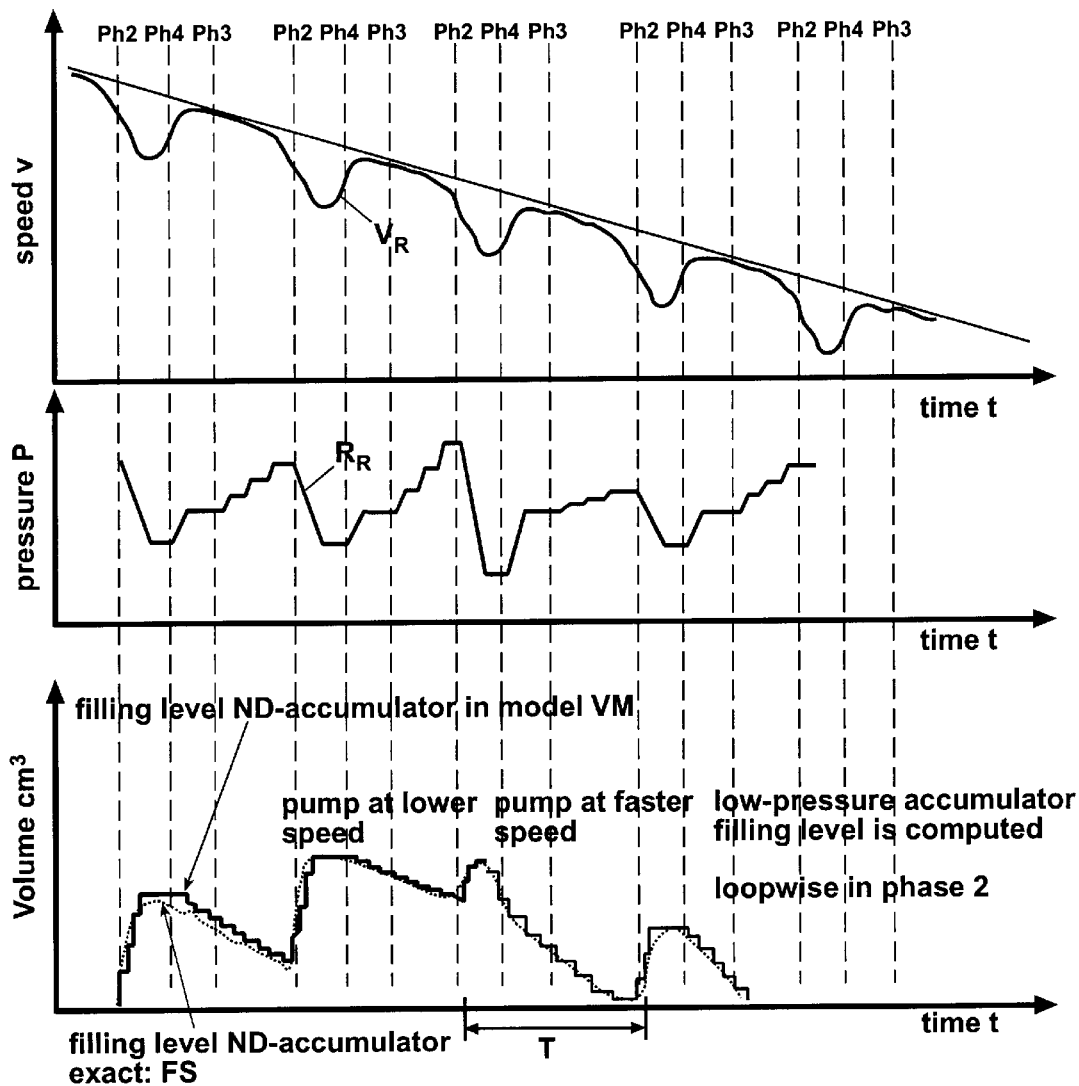
FIG. 2 diagrammatically shows the speed pattern of a wheel of an automotive vehicle during a control process; the course of pressure within the wheel brake of the said controlled wheel; and the filling level or the pressure fluid volume taken up by the low pressure accumulator as a result of the control operation under consideration.

The diagrams according to FIG. 2 serve to illustrate the control process under consideration to which the method of the invention is applied. The speed characteristic $v_R$, the pressure characteristic $p_R$ and the volume characteristics are plotted versus the same time axis t. An control process is under consideration, with phase 2 (Ph2) characterizing the brake pressure decrease commencing upon occurrence of a blocking tendency. In phase 2, the inlet valve EV1 or EV2 is closed while the outlet valve AV1 or AV2 (FIG. 1) is actuated and opened. After a predetermined time interval, the outlet valve closes so that the pressure remains constant as shown by the characteristic $p_R$ of the course of pressure. The pressure fluid discharged via outlet valves AV1, AV2 is taken up by the low pressure accumulator NDS evacuated by the hydraulic pump HP.

The lower characteristic according to FIG. 2 shows in broken lines the actual filling level $FS_{ist}$ of the low pressure accumulator in response to the control process to which the speed curve $v_R$ and the course of pressure $p2_R$ relate. The said filling level is copied in the method of the invention by a theoretically computed volume model VM. The filling level curve drawn in solid lines in FIG. 2 is indicative of the said volume model VM. During phase 2 (Ph2), the filling level of the low pressure accumulator is determined by the in-flow via the outlet valve, e.g. via AV1, and by the relatively slow evacuation via the discharging hydraulic pump HP actuated in the meanwhile.

During phases 3,4 (Ph 3,4) in which the outlet valve AV is closed and in which the brake pressure in the wheel rises again, as shown by the pressure curve, the actual filling level $FS_{ist}$ of the low pressure accumulator NDS and the volume model VM, decrease approximately linearly.

The volume characteristic according to FIG. 2 shows the course of the filling level at various pump speeds. When employing the method of the invention, the number of revolutions of pump HP is so dimensioned that during the interval T representing the space between two successive brake pressure decreasing phases Ph2, a complete evacuation of the low pressure accumulator 4 is achieved. As the pump circulates at a speed as low as possible, ideally, the evacuation of the low pressure accumulator should be terminated at the end of the time interval T. By employing the method of the invention, the number of revolutions is precisely determined and the speed required to safely and reliably evacuate the low pressure accumulator within the period of time T is predetermined.

Figure 3:
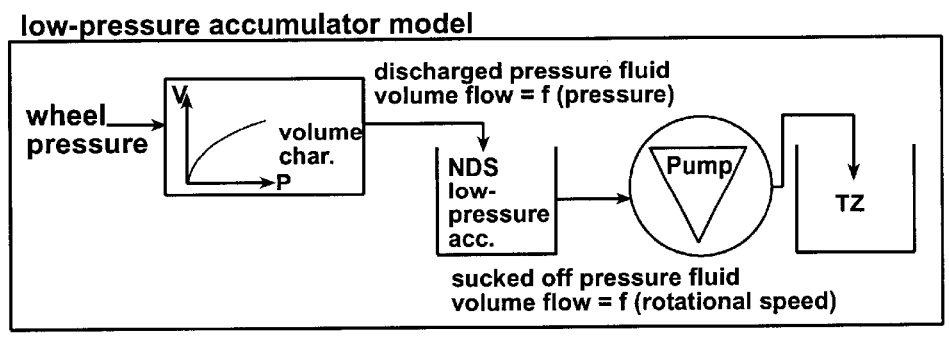
FIG. 3 schematically shows the process pattern of the invention.

FIG. 3 shows the essential elements and operations of the method of the invention. The brake fluid discharged into the low pressure accumulator is determined from the wheel pressure determined for each individual wheel under consideration of the pressure/volume characteristics of the system.

The volume flow via an outlet valve (AV) is a function of the brake pressure prevailing within the wheel brake.

Usually, respectively two wheel brakes are connected to a common low pressure accumulator as shown in FIG. 1. The time available for evacuating the low pressure accumulator, is dependent on the control frequency or on the time interval T between two successive brake pressure decreasing phases (Ph2). The number of revolutions or the delivery capacity of the hydraulic pump (HP) is, hence, determined by the control frequency and by the volume model or by the volume in the low pressure accumulator; however, as the low pressure accumulators of both brake circuits I, II are evacuated by a common pump which can be dual-circuited, the low pressure accumulator having the higher filling level determines the number of revolutions of the pump to insure the complete evacuation at the end of the time interval T between two successive brake pressure decreasing phases.

FIG. 4, again, shows in detail the individual steps and the control pattern during implementation of the method of the invention.

Firstly, the pressure changes dP are sensed for each individual wheel and are evaluated for determining the volume changes dV under consideration of the pressure/volume characteristics which, in general, are different for the front axle VA the rear axle HA. As the illustration in FIG. 4 is based on a diagonal brake circuit division, the volume changes dV of a front wheel and of a rear wheel $$dV(RadVL)+dV\ (RadHR); dV\ (RadVR)+dV\ (RadHL)$$

are respectively combined. The volume model VM and the filling level of the individual low pressure accumulators result from the in-flow of volume dV via the outlet valves leading to the connected wheel brakes, from the connected wheel brakes and from the off-flow from the respective low pressure accumulator as a result of the pump delivery. The respective maximum value MaxV, i.e. the filling level in the low pressure accumulator NDS1 or NDS2 having taken up largest amounts, is determinative for the continued course of the control steps. In each individual computing steps or loop, the maximum value determined by the volume model formation (VM) is fixed for specifing the delivery capacity $$V==dV/dt=V/T$$

and, hence, of the number of revolutions of the pump. dT or T represents the time interval between two successive pressure build-up phases (ph2).

Figure 4:
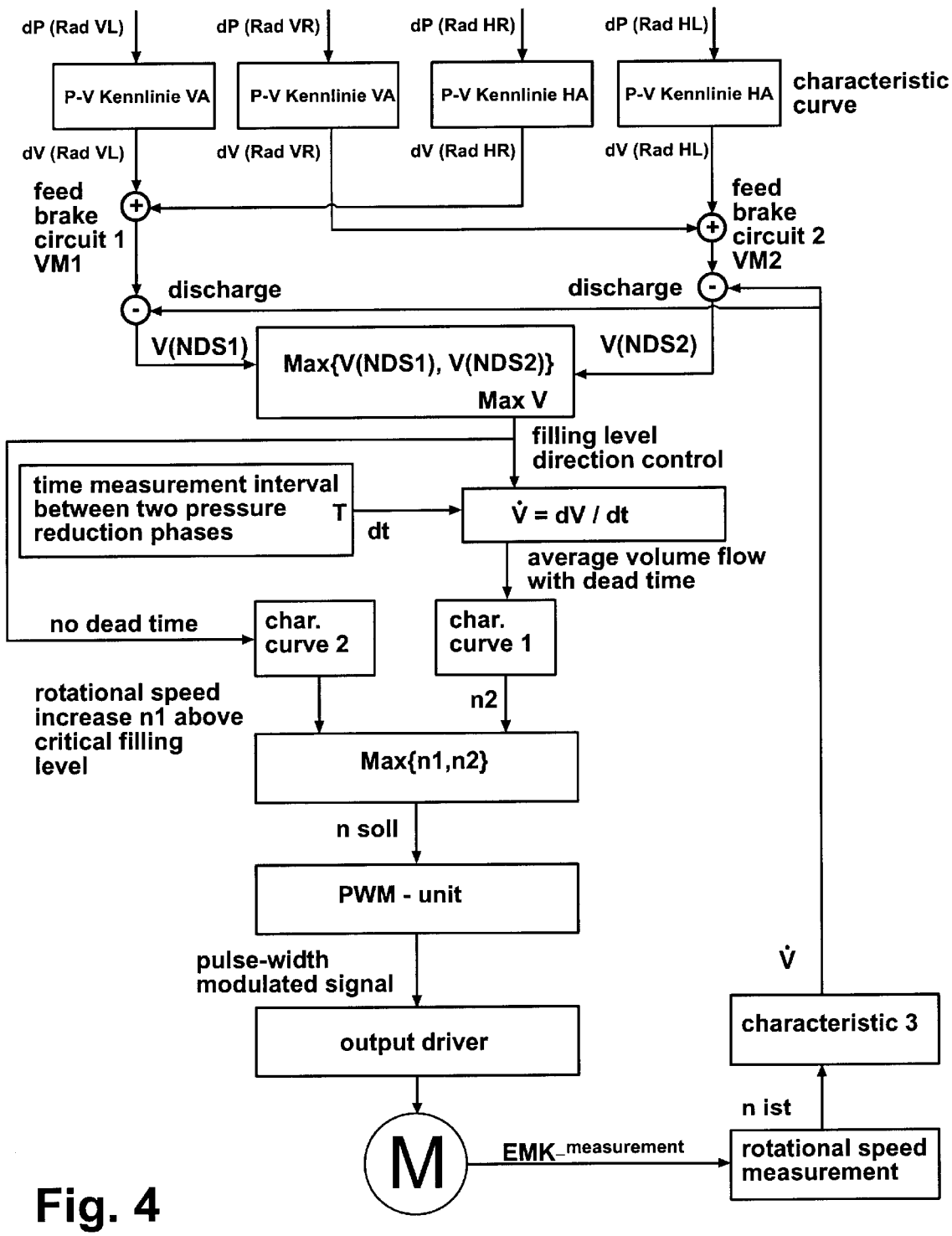
FIG. 4 diagrammatically shows the individual steps in sensing and processing the input variables for determining the number of revolutions of the pump in employing the method of the invention.
Figure 5:
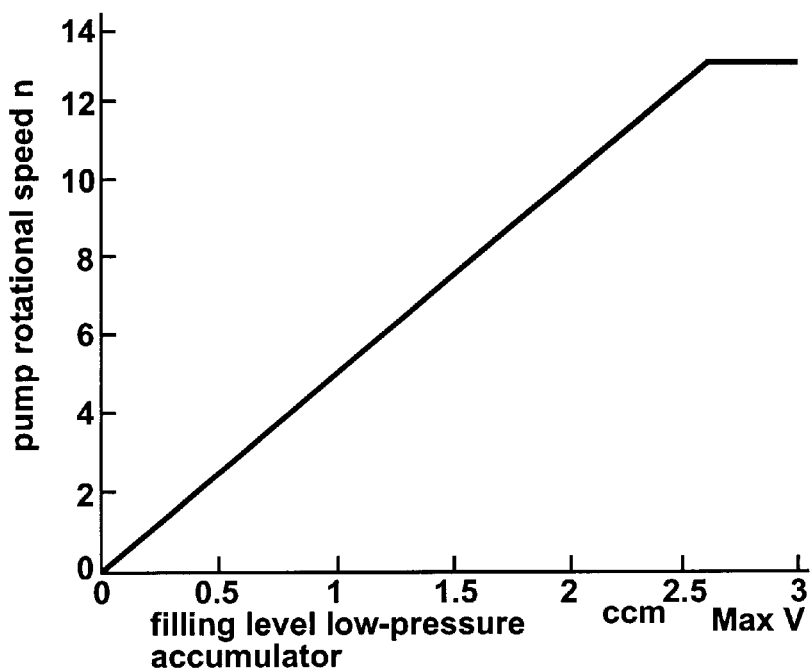
FIG. 5 diagrammatically shows the dependence of the number of revolutions on the filling level of the low pressure accumulator according to one form of embodiment of the invention.

As conveyed by FIG. 4, in response to the maximum value MaxV, a number of revolutions or delivery capacity of the hydraulic pump arising from characteristic 2 is determined directly. The said characteristic is shown in FIG. 5. In response to the filling level MaxV, a minimum value of the number of revolutions of the pump is preset which constitutes a pre-control commencing once the filling level of the low pressure accumulator, e.g. on account of an error or a particularly unfavorable condition, at the critical time, is above the value arising from the calculation V==dV/dt and V==V/T, respectively.

The value V=which arises from and is computed from the control frequency, with the values in the preceding computing cycle or loop being automatically considered, in accordance with FIG. 4 will result in a "characteristic1", whereas "characteristic 2" will, as previously explained, be directly derived from the actual value MaxV. Hence, the numbers of revolutions n1 and n2 will be determined independently.

The higher value Max (n1, n2) will now determine the preset nominal value $n_{soll}$ for the number of revolutions of the pump. In a subsequent computing step or in a special electronic unit (PWM unit), a pulse sequence is calculated which via an output driver is passed to the electric motor M of the hydraulic pump. The said pulse sequence will determine the number of revolutions of the pump.

In a control circuit, the actual number of revolutions $n_{ist}$ of the driving motor M of the hydraulic pump is measured, and the measured value $n_{ist}$ is evaluated under consideration of the speed/volume characteristic (characteristic 3). The number of revolutions of the driving motor M, can be determined by the so-called EMK measurement, i.e. by measuring the generator voltage in the pulse breaks.

The output value V=of characteristic 3, i.e. the pressure fluid discharged from the low pressure accumulators by the hydraulic pump, is returned and correspondingly considered in the formation of the volume model VM1 and VM2.

Figure 6:
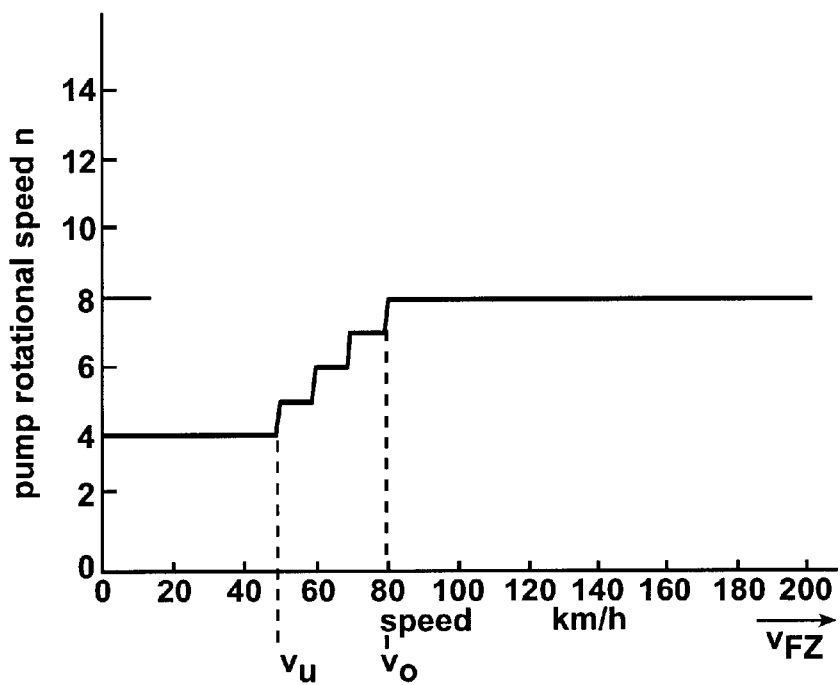
FIG. 6 diagrammatically shows one example of the dependence of the number of revolutions of the pump on the speed of the automotive vehicle.

Finally, FIG. 6 shows in the form of another characteristic that the number of revolutions of the pump can additionally be varied in response to the speed of the automotive vehicle. This characteristic also results in a minimum value. Should a higher value arise from characteristic 2 or characteristic 1, the same shall have priority.

FIG. 6 conveys that the minimum number of revolutions, at low vehicle speeds—in the present instance 50 km/h—can be relatively low and, with an increasing vehicle speed is increased continuously or—as shown—in steps, until an upper threshold value is reached. At low vehicle speeds the noise development is particularly critical for which reason a low number of revolutions of the pump is desirable. At higher speeds, it is important for a predetermined minimum delivery capacity to be safeguarded which is favored by the higher minimum number of revolutions.

What is claimed is:

1. In a controlled brake system containing at least one brake circuit, a plurality of wheel brakes, at least one low-pressure accumulator which takes up pressure fluid discharged in case of control from the wheel brakes and which is evacuated by a hydraulic pump, with a volume model being formed by sensing and evaluating of parameters determining the pressure fluid flow, with the volume model indicating by way of approximation of the pressure fluid in-flow and off-flow, a method for the adaptive control of the hydraulic pump comprising the steps of:

determining a brake pressure pattern for each individual wheel at least by way of approximation, forming a volume model for each brake circuit which a proximately indicates the pressure fluid volume taken up by the respective low-pressure accumulator or the filling level of the low-pressure accumulator based on a brake pressure pattern within the wheel brakes connected to one wheel brake circuit, determining a control frequency and a time interval, respectively, between two successive brake pressure decreasing phases; and dimensioning the delivery capacity of the hydraulic pump so that the time interval for two successive brake pressure decreasing phases is adequate for completely evacuating the respective low pressure accumulator.

2. A method to according to claims 1, including the step of:

forming a wheel brake pressure model on the basis of actual vehicle deceleration, actuating times of valves in the brake system, pressure/volume characteristic of the brake system, for determining the brake pressure pattern for each individual wheel.

3. A method according to claim 2, wherein the volume model is individually formed for each brake circuit on the basis of the brake pressure model for each individual wheel and on the basis of outlet valve actuating times and the pressure/volume characteristic of the hydraulic system inclusive of the wheel brakes and the low pressure accumulators.

4. A method to according to claim 1, including the step of adjusting a delivery rate of the hydraulic pump, in response to at least one of the following quantities: a maximum value of the filling level of the accumulator, the pressure fluid volumes taken up by the low-pressure accumulators and pressure fluid loads volumes taken up by the low-pressure accumulators, which volumes and loads are determined by the formation of the volume model, the adjustment being so dimensioned that the time interval between two successive brake pressure decreasing faces is just adequate for evacuating the low-pressure accumulators.

5. A method according to claim 4, wherein a minimum value of a delivery capacity and of the number of revolutions of the hydraulic pump is pre-set in response to the filling level and the pressure fluid volume taken up by the low-pressure accumulator.

6. A method according to claim 5, wherein the predetermined minimum value of the number of revolutions of the pump is dependent on the vehicle speed, with a lower threshold of the number of revolutions applying to a lower vehicle speed threshold and a higher threshold of the number of revolutions applying to a value above an upper vehicle speed threshold, and in the range between the lower and the higher speed thresholds the number of revolutions is raised linearly or in steps.

* * * * *